United States Patent
Draper et al.

(10) Patent No.: US 12,244,730 B2
(45) Date of Patent: Mar. 4, 2025

(54) SYSTEMS AND METHODS TO EVALUATE CLIENT DEVICE TRUST IN A DISTRIBUTED COMPUTING SYSTEM

(71) Applicant: GOOGLE LLC, Mountain View, CA (US)

(72) Inventors: John Draper, San Francisco, CA (US);
Colin Whittaker, Newton, MA (US);
Haidong Shao, Foster City, CA (US);
David Lee, Sunnyvale, CA (US);
Adrian Isles, Oakland, CA (US);
Maxim Kovalkov, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 933 days.

(21) Appl. No.: 17/191,344

(22) Filed: Mar. 3, 2021

(65) Prior Publication Data
US 2022/0286300 A1    Sep. 8, 2022

(51) Int. Cl.
*H04L 9/32* (2006.01)
*G06N 5/01* (2023.01)
(Continued)

(52) U.S. Cl.
CPC ............ *H04L 9/3255* (2013.01); *G06N 5/01* (2023.01); *G06N 20/00* (2019.01); *H04N 21/25875* (2013.01)

(58) Field of Classification Search
CPC ........ G06N 20/00; G06N 5/01; H04L 63/102; H04N 21/25875; H04N 21/44204; H04N 21/6581; H04N 21/8586; H04W 12/66
See application file for complete search history.

(56) References Cited

U.S. PATENT DOCUMENTS 9,721,296 B1 *    8/2017  Chrapko ............... G06Q 40/03
2013/0239168 A1 *  9/2013  Sreenivas ............. G06F 21/57
                                                726/1

(Continued)

FOREIGN PATENT DOCUMENTS

WO     2012/037056 A     3/2012

OTHER PUBLICATIONS

PCT Notification of Transmittal Of The International Search Report And The Written Opinion Of The International Searching Authority for PCT Application No. PCT/US2022/018771, mailed May 17, 2022, 15 pages.

(Continued)

*Primary Examiner* — Olugbenga O Idowu
(74) *Attorney, Agent, or Firm* — Lowenstein Sandler LLP

(57) ABSTRACT

A method includes receiving, by a processing device of a content sharing platform, a request for desired content from a client device, the content being stored in a content delivery network (CDN). The method further includes generating, based on data available to the content sharing platform, a partial trust metric associated with the client device, wherein the partial trust metric is to be used by a CDN server to make a decision regarding access to the desired content by the client device. The method further includes generating a response to the content request, wherein the response comprises one or more resource locators for accessing the desired content in the CDN, and the partial trust metric. The method further includes sending the response to the client device to enable the client device to request the desired content from the CDN server using the resource locator(s) and the partial trust metric.

11 Claims, 6 Drawing Sheets

(51) Int. Cl.
     *G06N 20/00*      (2019.01)
     *H04N 21/258*    (2011.01)

(56) References Cited

U.S. PATENT DOCUMENTS

| | | | |
|---|---|---|---|
| 2018/0205742 A1* | 7/2018 | Vinukonda | H04L 63/107 |
| 2022/0141223 A1* | 5/2022 | Makey | G06Q 50/01 |
| | | | 726/4 |

OTHER PUBLICATIONS

Min Li et al., "Trust-Based Access Control for Privacy Protection in Collaborative Environment", E-Business Engineering, 2009, ICEBE '09. IEEE International Conference On, IEEE, Piscataway, NJ USA, Oct. 21, 2009 (Oct. 21, 2009), pp. 425-430, XP031571880, ISBN: 978-0-7695-3842-6 *I. Introduction*, *II. Trust Evaluation*, *III. Trusted-based access control for privacy protection*.

Kangwoon Hong ETRI Korea (Republic OF),"Proposal for a trust-based service scenario; c xx", ITU-T Draft; Study Period 2013-2016, International Telecommunication Union, Geneva; CH (vol. 16/13) Aug. 29, 2016 (Aug. 29, 2016), pp. 1-3, XP044180695, Retrieved from the Internet: URL:https://www.itu.int / ifa / t / 2013 /sg13/ ex change / wp3 / q16 / 201608 /contributions / Q16-13 -Aug16-C-50-Y.trustworthy-media-gwhong-1.d ocx 'retrieved on Aug. 29, 2016) the whole document.

\* cited by examiner

SYSTEMS AND METHODS TO EVALUATE CLIENT DEVICE TRUST IN A DISTRIBUTED COMPUTING SYSTEM

TECHNICAL FIELD

Aspects and embodiments of the disclosure relate to content sharing platforms, and more specifically, to evaluating client device trust in a distributed computing system.

BACKGROUND

Content delivery platforms connecting via the Internet allow users to connect to and share information with each other. Many content delivery platforms include a content sharing aspect that allows users to upload, view, and share content, such as video items, image items, audio items, and so on. Other users of the content delivery platform may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

An aspect of the disclosure provides a method comprising: receiving, by a processing device of a content sharing platform, a request for desired content from a client device, the content being stored in a content delivery network (CDN); generating, based on data available to the content sharing platform, a partial trust metric associated with the client device, wherein the partial trust metric is to be used by a CDN server to make a decision regarding access to the desired content by the client device; generating a response to the content request, wherein the response comprises one or more resource locators for accessing the desired content in the CDN, and the partial trust metric; and sending the response to the client device to enable the client device to request the desired content from the CDN server using the one or more resource locators and the partial trust metric.

A further aspect of the disclosure provides a system comprising: a memory; and a processing device, coupled to the memory, to: receive, by a processing device of a content sharing platform, a request for desired content from a client device, the content being stored in a content delivery network (CDN); generate, based on data available to the content sharing platform, a trust package associated with the client device, wherein the trust package is to be used by a CDN server to make a decision regarding access to the desired content by the client device; generate a response to the content request, wherein the response comprises one or more resource locators for accessing the desired content in the CDN, and the trust package; and send the response to the client device to enable the client device to request the desired content from the CDN server using the one or more resource locators and the trust package.

A further aspect of the disclosure provides a computer program product (such as a tangible computer-readable medium or a software product which can be downloaded without necessarily being stored for a non-transitory way) comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
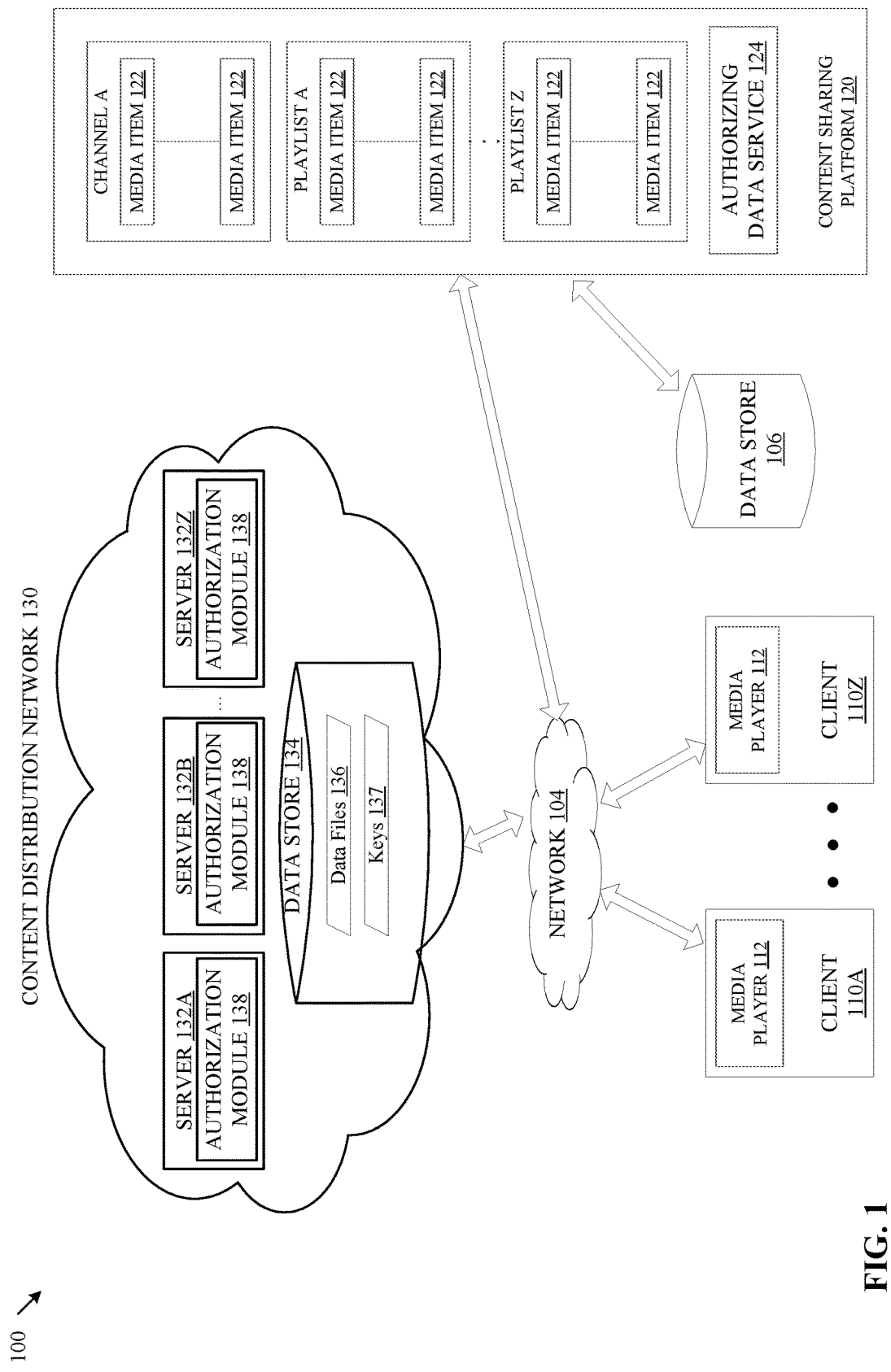
FIG. 1 illustrates an example system architecture, in accordance with an embodiment of the disclosure.

A content sharing platform (also referred to as a "content delivery platform" herein) may offer content, such as video items, audio items, or gaming items, to users via client devices. A user may log into a user account associated with the content sharing platform to access the content sharing platform and upload and/or consume the content. The content sharing platform may use a content distribution network (CDN) (also referred to as a "content delivery network" herein) to store the content and provide it to client devices. A CDN can include a geographically distributed network of servers that work together to provide high availability and high performance in the delivery of content. For example, server A of the CDN that in a same geographical vicinity as client device A can be selected to deliver content to client device A. Content delivered by server A can be delivered to client device A faster than another server, server B of CDN, that is not located in the same geographical vicinity as client device A.

In some systems, a user, via a media player (e.g., a mobile application, a web browser, etc.) on a client device, can request content from a content sharing platform. The content sharing platform, using an authorization service, can authorize the user account associated with the user to determine whether the user has permission to access the requested content. If the user account is authorized to access the content, the content sharing platform can generate one or more resource locators (e.g., uniform resource locators (URLs)) that can be used by the client device to obtain the requested content from a CDN. For example, the content sharing platform can generate the URLs, send them to the client device, and the client device can request the desired content from the CDN using the URLs.

However, in some instances, a user can use an unauthorized media player (e.g., an overlay application, a third party media player, a modified media player, etc.) to access content from the CDN and perform unauthorized functions on the received content. For example, the unauthorized media player can be capable of downloading the received content onto a local storage medium, a feature that can be prohibited by the content sharing platform. In other instances, a user can deceive the content sharing platform and the CDN by requesting the URLs from the content sharing platform using an authorized media player, and then using the URLs to request the content from the CDN using an unauthorized media player. Such deception may be possible because, due to security reasons, a content sharing platform may desire not to share, with the CDN (which may be more susceptible to a security breach than highly-privileged core services of the content sharing platform), data relating to user account information, verification protocols, and the like, and therefore the CDN may not be able to accurately assess the trustworthiness of client devices sending requests for content.

Accordingly, in current systems, it is difficult to identify content requests from unauthorized media players. This can cause the content sharing platform and/or the CDN to mistakenly grant permission to the unauthorized media player to access the requested content, leading to the unauthorized media player performing unauthorized functions on the received content.

Aspects and implementations of the present disclosure address these and other shortcomings of the existing technology by enabling a content sharing platform to generate a partial trust metric for use by the CDN to determine the trustworthiness (e.g., authenticity) of the client device. In an example embodiment, responsive to receiving a request for content from the client device, the content sharing platform can generate a partial trust metric for the client device. The partial trust metric can be any score, indicator, or other type of quantifiable measure used to indicate to the CDN the authenticity of the client device, the media player used by the client device, or the user account associated with the user. In particular, the partial trust metric can be created based on data available to the content sharing platform and can be used to indicate to the CDN the likelihood that the user, the media player, and/or the client device is authorized to access the requested content, as opposed to an unauthorized entity, such as those of a third party media player, a bot, a server farm, and so forth. The data used to create the partial trust metric can include factors associated with the client device, the user account, the media player, or any combination thereof. In some embodiments, the factors can include a watch history of the user, whether the user previously viewed the content, whether the client device previously decrypted content successfully, whether the user is logged-in, whether the user has engaged or been suspected of engaging in unauthorized activity, the client device's IP address, an encryption log associated with the client device, and so forth. In some embodiments, the content sharing platform can generate the partial trust metric by using a heuristic approach, a machine learning approach, or other approaches.

The content sharing platform can then generate one or more resource locators (e.g., uniform resource locators (URLs)) to enable the client device to request the desired content from the CDN. The content sharing platform can append the resource locator(s) with the partial trust metric, and digitally sign the resulting response. The digital signature can be based on signed parameters (e.g., expiration parameter indicating when the use of the resource locator(s) and/or the partial trust metric should expire, bit rate parameter for delivering the requested content, an identifier of a playback event created for and associated with the content request, etc.), which are used to indicate to the CDN how the data is to be served. The client device can request the content from a CDN server using the resource locator(s) and the partial trust metric received from the content sharing platform.

Responsive to receiving the request with the resource locators and the partial trust metric from the client device, the CDN server can determine the client device trust status based on the partial trust metric. The client device trust status can be any type of indicator used by the CDN to determine whether to provide the requested content to the user. In some embodiments, the CDN can use the partial trust metric and one or more additional factors identified by the CDN (based on information available to the CDN) to obtain a final trust metric, and compare the final trust metric to one or more threshold values to determine the client device trust status (e.g., high reliability, medium reliability, low reliability). Based on the comparison, the CDN can reduce or cap the resolution of the requested content (e.g., from high definition to standard definition), reduce or cap the frame rate, and so forth.

In some embodiments, if the content sharing platform provides multiple resource locators for the desired content, the client device sends a separate request to a CDN server for each resource locator and includes the partial trust metric received from the content sharing platform in each of these requests. Based on the partial trust metric included in each request, the CDN server can ensure that all of the multiple requests for the desired content (e.g., multiple requests for portions of a particular video) are from a trustworthy media player, thereby protecting from malicious users that may use an authorized media player to obtain a first of portion of the desired content and then switch to an unauthorized player for the remainder of the desired content.

In some embodiments, rather than (or an addition to) providing a partial trust metric to the client device, the content sharing platform can provide a trust package that includes multiple characteristics indicating, for example, whether the user is logged in, a browser type used by the user to request the content, the geographic location of the client device, the IP address of the client device, and so forth. When requesting content from the CDN server, the client device can provide the trust package to the CDN server, which can then use the characteristics from the trust package (and in some embodiments information available to the CND server locally) to determine whether to provide the requested content to the user.

Aspects of the present disclosure result in technological advantages in improved performance of the media player of a client device, improved security for content stored by CDNs, improved security for user data, and improved security for the overall performance of the content sharing platform. In particular, the aspects of the present disclosure enable a content sharing platform and a CDN to verify the authenticity of the media player requesting content without subjecting a user to the latency associated with prolonged verification techniques. As such, the technology disclosed herein enables the user to have a stable and uninterrupted viewing experience. Further, aspects of the present disclosure enable a CDN to verify the user account and/or client device based on an opaque partial trust measure that does not expose the CDN (which may be susceptible to outside attacks) to information known to a highly secured core service of the content sharing platform that is used to generate the partial trust measure. Additionally, the technology disclosed herein can include reducing the consumption of computational, memory, and bandwidth resources by the content sharing platform by allowing the CDN to perform authorization for the delivery of the requested content.

Implementations of the present disclosure often reference videos for simplicity and brevity. However, the teaching of the present disclosure are applied to media items generally and may be applied to various types of content, including for example, video, audio, text, images, program instructions, etc.

FIG. 1 illustrates an example system architecture 100, in accordance with one implementation of the present disclosure. The system architecture 100 (also referred to as "system" herein) includes a content sharing platform 120 (also referred to as a "content distribution platform" herein), a data store 106, client devices 110A-110Z (generally referred to as "client device(s) 110" herein) connected to a network 104, and a content distribution network (CDN) 130 (also referred to as a "content delivery network" herein). The CDN 130 may include a plurality of server machines 132A-132Z (also referred to as "server(s) 132A-132Z" herein).

Network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Data store 106 may be a persistent storage that is capable of storing content items (such as media items) as well as data structures to tag, organize, and index the content items. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by content sharing platform 120 or one or more different machines coupled to the content sharing platform 120. In some embodiments, data store 106 may be coupled to content sharing platform 120 via network 104.

Client devices 110A-110Z may each include computing devices such as personal computers (PCs), laptops, mobile phones, smart phones, tablet computers, netbook computers, network-connected televisions, etc. In some embodiments, client devices 110A-110Z may also be referred to as "user devices." In some embodiments, each client device 110A-110Z may include a media player 112 (or media viewer) and a token module 114. In some embodiments, the media players 112 may be applications that allow users to playback, view, or upload content, such as images, video items, web pages, documents, audio items, etc. For example, the media player 112 may be a web browser that can access, retrieve, present, or navigate content (e.g., web pages such as Hyper Text Markup Language (HTML) pages, digital media items, etc.) served by a web server. The media player 112 can render, display, or present the content (e.g., a web page, a media viewer) to a user. The media player 112 can also include an embedded media player (e.g., a Flash® player or an HTML5 player) that is embedded in a web page (e.g., a web page that may provide information about a product sold by an online merchant). In another example, the media player 112 can be a standalone application (e.g., a mobile application, or native application) that allows users to playback digital media items (e.g., digital video items, digital images, electronic books, etc.). According to aspects of the present disclosure, the media player 112 can be a content sharing platform application for users to record, edit, and/or upload content for sharing on the content sharing platform. As such, the media players 112 can be provided to the client devices 110A-110Z by content sharing platform 120. For example, the media players 112 can be embedded media players that are embedded in web pages provided by the content sharing platform 120. In another example, the media players 112 may be applications that are downloaded from content sharing platform 120.

In some embodiments, content sharing platform 120, and/or server machines 132A-132Z may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to media items or provide the media items to the user. For example, content sharing platform 120 may allow a user to consume, upload, search for, approve of ("like"), disapprove of ("dislike"), or comment on media items. Content sharing platform 120 may also include a website (e.g., a webpage) or application back-end software that may be used to provide a user with access to the media items.

In some embodiments of the disclosure, a "user" may be represented as a single individual. However, other embodiments of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 can include multiple channels (e.g., channels A through Z, of which only channel A is shown in FIG. 1). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, content sharing platform 120 or other social networks can insert recommended content items into the user's syndicated feed, or may insert content items associated with a related connection of the user in the syndicated feed.

Each channel may include one or more media items 122. Examples of a media item 122 can include, and are not limited to, digital video, digital movies, digital photos, digital music, audio content, melodies, website content, social media updates, electronic books (ebooks), electronic magazines, digital newspapers, digital audio books, electronic journals, web blogs, real simple syndication (RSS) feeds, electronic comic books, software applications, etc. In some embodiments, media item 122 is also referred to as content or a content item.

For brevity and simplicity, rather than limitation, a video item, audio item, or gaming item are used as an example of a media item 122 throughout this document. As used herein, "media," "media item," "online media item," "digital media," "digital media item," "content," and "content item" can include an electronic file that can be executed or loaded using software, firmware or hardware configured to present the digital media item to an entity. In one embodiment, content sharing platform 120 may store the media items 122 using the data store 106. In another embodiment, content sharing platform 120 can store video items or fingerprints as electronic files in one or more formats using data store 106.

In some embodiments, media items 122 are video items. A video item is a set of sequential video frames (e.g., image frames) representing a scene in motion. For example, a series of sequential video frames may be captured continuously or later reconstructed to produce animation. Video items may be presented in various formats including, but not limited to, analog, digital, two-dimensional and three-dimensional video. Further, video items may include movies, video clips or any set of animated images to be displayed in sequence. In addition, a video item may be stored as a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example.

In some embodiments, the media item can be streamed, such as in a live stream to one or more of client devices 110A-110Z. It is be noted that "streamed" or "streaming" refers to a transmission or broadcast of content, such as a media item, where the received portions of the media item may be played back by a receiving device immediately upon receipt (within technological limitations) or while other portions of the media content are being delivered, and without the entire media item having been received by the receiving device. "Stream" may refer to content, such as a media item, that is streamed or streaming. A live-stream media item may refer to a live broadcast or transmission of a live event, where the media item is concurrently transmitted, at least in part, as the event occurs to a receiving device, and where the media item is not available in its entirety.

In some embodiments, content sharing platform 120 can allow users to create, share, view or use playlists containing media items (e.g., playlist A-Z, containing media items 122). A playlist refers to a collection of media items that are configured to play one after another in a particular order without any user interaction. In some embodiments, content sharing platform 120 may maintain the playlist on behalf of a user. In some embodiments, the playlist feature of the content sharing platform 120 allows users to group their favorite media items together in a single location for playback. In embodiments, content sharing platform 120 may send a media item on a playlist to client device 110 for playback or display. For example, media viewer 112 may be used to play the media items on a playlist in the order in which the media items are listed on the playlist. In another example, a user can transition between media items on a playlist. In yet another example, a user can wait for the next media item on the playlist to play or can select a particular media item in the playlist for playback.

In some embodiments, the user can access content on sharing platform 120 through a user account. The user can access (e.g., log in to) the user account by providing user account information (e.g., username and password) via an application on client device 110 (e.g., media viewer 112). In some embodiments, the user account may be associated with a single user. In other embodiments, the user account can be a shared account (e.g., family account shared by multiple users) (also referred to as "shared user account" herein). The shared account can have multiple user profiles, each associated with a different user. The multiple users can login to the shared account using the same account information or different account information. In some embodiments, the multiple users of the shared account may be differentiated based on the different user profiles of the shared account.

In some embodiments, an authorizing data service 124 (also referred to as a "core data service" or "authorizing data source" herein) is a highly-secured service that has access to data pertaining to user accounts on the content sharing platform 120 and that can use this data to decide whether to authorize a user account to obtain requested content. In some embodiments, authorizing data service 124 can authorize a user account (e.g., client device associated with the user account) access to requested content, authorize delivery of the requested content to the client device, or both. Authorization of the user account to access the requested content can involve authorizing what content is accessed and who is permitted to access the content. Authorization of the delivery of the content can involve authorizing how the content is delivered.

In some embodiments, authorizing data service 124 can use user account information to authorize the user account. In some embodiments, an authentication token associated with client device 110 or media player 112 can be used to determine whether to authorize the user account and/or playback of requested content.

In some embodiments, authorizing data service 124 is part of content sharing platform 120. In other embodiments, authorizing data service 124 can be an external service, such as a highly-secured authorizing service offered by a third-party.

As noted above, content distribution network (CDN) 130 can include one or more nodes, represented as server machines 132A-132Z (generally referred to as "server machine(s) 132" or "server(s) 132" herein). In embodiments, content distribution network 130 includes a geographically distributed network of servers that work together to provide fast delivery of content. The network of servers are geographically distributed to provide high availability and high performance by distributing content or services based, in some instances, on proximity to client devices 110. The closer a CDN server is to a client device 110, the faster the content can be delivered to the client device 110.

For example, different server machines 132A-132Z can be distributed geographically within a particular country or across different countries. User A using client device 110A located in the Great Britain can request to obtain content hosted by content sharing platform 120. The request can be received by authorizing data service 124 of content sharing platform 120 and the user account associated with user A can be authorized to obtain the requested content. Subsequent to authorization, content sharing platform 120 can send a resource locator, such as a uniform resource locator (URL), to the client device 110A. A resource locator can refer to a reference that specifies a location or address of a resource (e.g., content) on a computer network and a mechanism for retrieving the resource. The resource locator can direct the client device 110A to obtain the content from a server machine 132 of content distribution network 130 that is located geographically proximate to client device 110A. For example, the resource locator can direct the client device 110A to obtain the requested content from a particular server machine 132 of content distribution network 130 that is also located in Great Britain. In another example, another user B using client device 110B located in the west coast of the United States requests to obtain the same content as user A. The request can be received by authorizing data service 124 of content sharing platform 120 and the user account associated with user B can be authorized to obtain the requested content. Subsequent to authorization, content sharing platform 120 can send a resource locator to the client device 110B. The resource locator can direct the client device 110B to obtain the content from a server machine 132 of content distribution network 130 that is located geographically proximate to client device 110B. For example, the resource locator can direct the client device 110B to obtain the requested content from a server machine 132 of content distribution network 130 located at the west coast of the United States.

In some embodiments, content distribution network 130 is part of content sharing platform 120. In other embodiments, the content distribution network 130 is a third-party platform that provides CDN services to content sharing platform 120. In other embodiments, some of content distribution network 130 can be operated by content sharing platform 120 and another part of content distribution network 130 can be operated by a third-party. In embodiments, content distribution network 130 includes a data store, such as data store 134. Data store 134 can be similar to data store 106. Data store can include data files 136 for content, such as media content. Data store 106 can also include one or more cryptographic keys 137, such as one or more public keys or one or more private keys.

Authorization module 138 can be included in server 132 of CDN 130. Authorization module 138 can perform aspects of the disclosure described herein. For example, authorization module 138 can determine a client device trust status. The client device trust status can be any type of indicator used by CDN 130 to determine whether to release requested content to a user. As explained in more detail herein, the client device trust status can be determined based on a partial trust metric or a trust package.

In general, functions described in one embodiment as being performed by the content sharing platform 120, and/or content distribution network 130 can also be performed on the client devices 110A through 110Z in other embodiments, if appropriate. In addition, the functionality attributed to a particular component can be performed by different or multiple components operating together. The content sharing platform 120 or content distribution network 130 can also be accessed as a service provided to other systems or devices through appropriate application programming interfaces, and thus is not limited to use in websites.

Although embodiments of the disclosure are discussed in terms of content sharing platforms and promoting social network sharing of a content item on the content sharing platform 120, embodiments may also be generally applied to any type of social network providing connections between users, or content delivery platform. Implementations of the disclosure are not limited to content sharing platforms that provide channel subscriptions to users.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
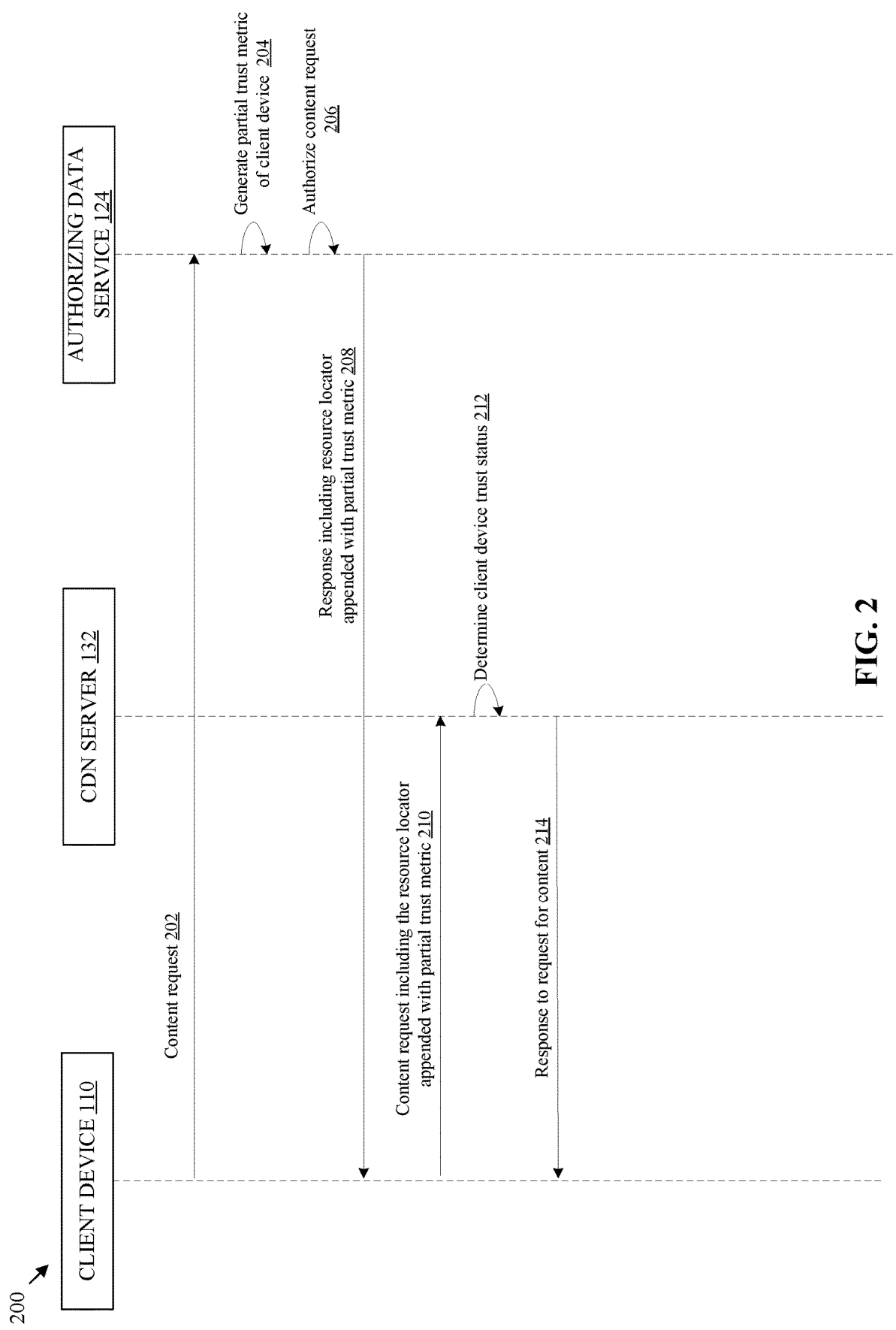
FIG. 2 is a diagram of operations for evaluating client device trust, in accordance with embodiments of the disclosure.

FIG. 2 is a diagram of operations for evaluating client device trust, in accordance with embodiments of the disclosure. System 200 may include similar components as system architecture 100 of FIG. 1. It may be noted that components of FIG. 1 may be used to help describe FIG. 2. For purposes of illustration, rather than limitation, operations with respect to system 200 are described as performed by authorizing data service 124 of content sharing platform 120, server machine 132 of content distribution network 130, or client device 110 may be performed by any component thereof, unless otherwise described. The operations described with respect to FIG. 2 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 202, responsive to a user input for content, client device 110 sends a request to obtain content to authorizing data service 124 of content sharing platform 120. For example, a user of client device 110 can request to play a video item that is hosted by content sharing platform 120. In some embodiments, the user can use an application, such as a browser or native application, to request the content from content sharing platform 120. The content may be stored on one or more nodes or servers of a content delivery network (one or more CDN servers 132).

In some embodiments, the request from client device 110 to the authorizing data service 124 can include the format of the data to be received. For instance, the request can include a format of the video item that is compatible with the media viewer 112 at the client device 110. In some embodiments, the request can include additional information (e.g., type, version, etc.) pertaining to the media viewer 112 at which the content, such as a video item, is to be played back.

In some embodiments, the content request can include identifiers of the client device, or user account attempting to obtain the content. For example, the user request can identify a username and password associated with the user account requesting to obtain the content. In another example, the request can include a cookie that identifies the client device 110 or application at the user device, which can be used to identify a particular user account. For example, a user can login to content sharing platform 120 using user account information and, responsive to content sharing platform 120 authorizing the user account, the content sharing platform 120 can send a cookie to user device 120. In yet another example, the content request can include other data associated with the user or a user account, such as, for example, an internet protocol (IP) address associated with the client device.

At operation 204, authorizing data service 124 of content sharing platform 120 can generate a partial trust metric associated with the content request. The partial trust metric can be any score, indicator, or other type of quantifiable measure used to indicate to server 132 the authenticity of the client device, the media player used by the client device, or the user account. In particular, the partial trust metric can be used to indicate to CDN server 132 the likelihood that the user, the media player, and/or the client device is trustworthy and should be authorized to access the requested content, as opposed to an unauthorized entity (e.g., an unauthorized media player, a bot, a server farm, and so forth).

The authorizing data service 124 can generate the partial trust metric based on factors (e.g., data, signals, etc.) associated with client device 110 (or the user account, media player 112, or any combination thereof). One or more factors can be accessible by authorizing data service 124, but not available to server 132. In some embodiments, the factors can include a watch history of the user, whether the user viewed the content before, whether the client device previously decrypted content successfully, whether the user is logged-in, whether the user has engaged or been suspected of engaging in an authorized activity, the user's IP address, an encryption log associated with the user, and so forth.

In some embodiments, authorizing data service 124 can generate the partial trust metric by using a heuristic approach. According to the heuristic approach, authorizing data service 124 uses heuristic rules that involve assigning a weight and numerical value between 0 and 1 for each factor used in generating the partial trust metric, and combining the weighted factors to generate a partial trust metric. In one example, for the factor of whether the client device previously decrypted content successfully, a numerical value of 0 can be assigned if the user has not previously decrypted content successfully, or a numerical value of 1 can be assigned if the user has previously decrypted content successfully. In another example, for the factor of whether the client device previously decrypted content successfully, a numerical value of 0 can be assigned if the user has not previously decrypted content successfully, a numerical value of 0.5 can be assigned if the user has previously decrypted content successfully fewer than five times, and a numerical value of 1 can be assigned if the user has previously decrypted content successfully at least five times. Different scales and any score values can be used with each factor to determine the partial trust metric. Accordingly, in some embodiments, the partial trust metric can be a sum of each weighted factor, which can be normalized between 0 and 1.

In some embodiments, authorizing data service 124 can generate the partial trust metric by using a machine learning approach. In the machine learning approach authorizing data service 124 may use a trained partial trust predicting model, which can be a machine learning model corresponding to a model artifact that is created by a training engine using training data that includes training inputs and corresponding target outputs (i.e., indicated answers for respective training inputs). The training inputs can be based on historical data and include factors associated with various client devices previously requesting content from authorizing data service 124 and/or CDN server 132. The target outputs can include indications of whether the client devices were authorized to obtain the requested content. In another implementation, the partial trust predicting model can be trained for a specific user based on training data associated with the user, and or the media player and/or the client device of the user.

At operation 206, authorizing data service 124 of content sharing platform 120 can authorize the content request. To authorize the request, authorizing data service 124 can determine that at least one of the client device 110 or the user (or user account), is permitted to obtain the content. In some embodiments, authorizing data service 124 can determine whether the partial trust metric satisfies (e.g., is greater than) an authorization threshold value. The authorization threshold value can be any value used to determine whether client device 110 should be authorized to receive content identifiers from content sharing platform 120. Responsive to the partial trust metric satisfying the authorization threshold value, authorizing data service 124 can authorize the content request. For example, responsive to the partial trust metric being greater than 0.2, client device 110 can be deemed authorized.

In some embodiments, determining whether to authorize the content request can be independent of the authorization threshold value. In one example, the content request can identify the account information of the user account requesting to obtain the content. For example, the account information can be encrypted in a cookie. In another example, the account information can be input by the user and provided in the request. In some embodiments, the account information, such as the username and password, can be authenticated by the authorizing data service 124 by comparing the account information (e.g., received username and password) with a stored record of the account information. If the account information of the request matches the account information of the record, the authorizing data service 124 can determine that the particular user account is authenticated, and the authorizing data service 124 can authorize the content request and assign a predefined partial trust metric to the content request.

In some embodiments, responsive to the authorizing data service 124 failing to authorize the content request and/or authenticate client device 110, the content request can be denied by authorizing data service 124. In some embodiments, if authorizing data service 124 does not authorize the request to obtain the content, authorizing data service 124 can send a message to client device 110 indicating that authorization is not granted to obtain the requested content.

In some embodiments, responsive to the authorizing data service 124 authorizing the request to obtain the content, the authorizing data service 124 generates one or more resource locators (e.g., URLs) to authorize the client device 110 to obtain the requested content from CDN 130. In some embodiments, the resource locators can identify the CDN server 130 that is to deliver the requested content to the client device 110. For example, the resource locators can include a hostname, which identifies the particular server (e.g., server 112A, server 112B, etc.) that can be accessed to obtain the requested content. In some embodiments, the authorizing data service 124 can append the resource locator (s) with the partial trust metric, and can digitally sign the resulting response. The digital signature can be based on signed parameters (e.g., expiration parameter, bit rate parameter, playback event identifier, etc.) that can be used to indicate to CDN 130 which data is to be served and how the data is to be served. In some embodiments, the digital signature can be encrypted.

At operation 208, responsive to the user account being authorized, authorizing data service 124 can send a response to the request for content (e.g., operation 202) to client device 110. In some embodiments, the response can include the one or more resource locators that identifies CDN server 132 that is to deliver the content to the client device 110, and the partial trust metric. In some embodiments, the response can also include the digital signature. In some embodiments, the response can include one or more of a content identifier, a user account identifier and/or a playback event identifier associated with the content request. In some embodiments, the response can be a HyperText Transfer Protocol (HTTP) response.

At operation 210, client device 110 can request the content using the resource locator and the partial trust metric, appended with the digital signature. In some embodiments, the request can be sent to CDN server 132. In some embodiments, CDN server 132 can decrypt the digital signature using, for example, one or more cryptographic keys, public keys, private keys, etc.

At operation 212, CDN server 132 can determine the client device trust status based on the partial trust metric. The client device trust status can be any type of indicator used by CDN server 132 to determine whether to release the requested content to the user. In some embodiments, CDN server 132 can compare the partial trust metric to one or more threshold values to determine the client device trust status. Based on the comparison, server 132 can reduce or cap the resolution of the requested content (e.g., 2160 p, 1440 p, 1080 p, 720 p, 480 p, 540 p, 360 p, 240 p, etc.), reduce or cap the frame rate (e.g., 24 frames per second (fps), 25 fps, 30 fps, 60 fps, 120 fps, etc.), throttle the data transmitted to client device 110, and so forth. In one example, responsive to server 132 determining that the partial trust metric is greater than a first threshold value (e.g., 0.5), server 132 can determine that the client device is trusted and provide the content in the format requested (e.g., standard definition, high definition, etc.). Responsive to server 132 determining that the partial trust metric is less than the first threshold value (e.g., 0.5) but greater than a second threshold value (e.g., 0.2), server 132 can determine that the client device is questionable and release the content only in standard definition rather than high definition. Responsive to server 132 determining that the partial trust metric is less than the second threshold value (e.g., 0.2), server 132 can determine that the client device is not to be trusted and reject the content request.

In some embodiments, based on the determined client device trust status, CDN server 132 may request client device 110 to perform one or more additional functions prior to CDN server 132 releasing the requested content. The additional functions can include requesting a ReCaptcha verification, requesting the user of client device 110 to sign in, etc. For example, responsive to CDN server 132 determining that the partial trust metric is less than the first threshold value (e.g., 0.5) but greater than a second threshold value (e.g., 0.2), CDN server 132 can determine that the client device is questionable and request the user to sign into their user account.

In some embodiments, CDN server 132 can combine the partial trust metric with one or more additional CDN associated factors to determine the client device trust status. The additional factors can be identified by CDN server 132 based on information available to CDN server 132. In particular, the additional factors can include any data relating to client device 110, the user (user account), and/or the content request to CDN server 132 (at operation 210) that is determined by CDN server 132 based on the content request to CDN server 132 or other information available to CDN server 132 locally. For example, the additional factors (CDN determined factors) can include the IP address used to request the content, one or more cookies provided to CDN 130 with the content request, a client agent reported by the client device (e.g., a browser, a bot, a download manager, an app accessing the internet, etc.), the type of the requested content (e.g., popular, private, advertising, a paid video, etc.), the bitrate of the requested content, the amount of content requested in the request, and so forth. In some embodiments, CDN server 132 can determine the device trust status by raising or lowering the partial trust metric based on one or more of the CDN determined factors, then comparing the new trust metric to one or more threshold values. In an illustrative example, a suspicious IP address can result in lowering the partial trust metric by a value of 0.1. Thus, in response to client device 110 being assigned a partial trust metric of 0.25, and CDN server 132 determining that the content request at operation 210 was received from a suspicious IP address, CDN server 132 can lower the partial trust metric by a value of 0.1, and compare the new trust metric of 0.15 to one or more threshold values to determine the client device trust status of client device 110. In some embodiments, CDN server 132 can combine the partial trust metric with one or more CDN determined factors using a heuristic approach, where each CDN determined factor and/or the partial trust metric can be assigned a weight, and weighted factors are combined with the weighted or unweighted partial trust metric to determine the client device trust status. In other embodiments, CDN server 132 can combine the partial trust metric with the one or more CDN determined factors using a machine learning approach.

At operation 214, based on the client device trust status, CDN server 132 can respond to the content request with content associated with the resource locator(s). For example, the response can include the requested video item when the client device trust status indicates that the client device is trusted, or with the requested video item in a lower format than requested when the client device is questionable.

Figure 3:
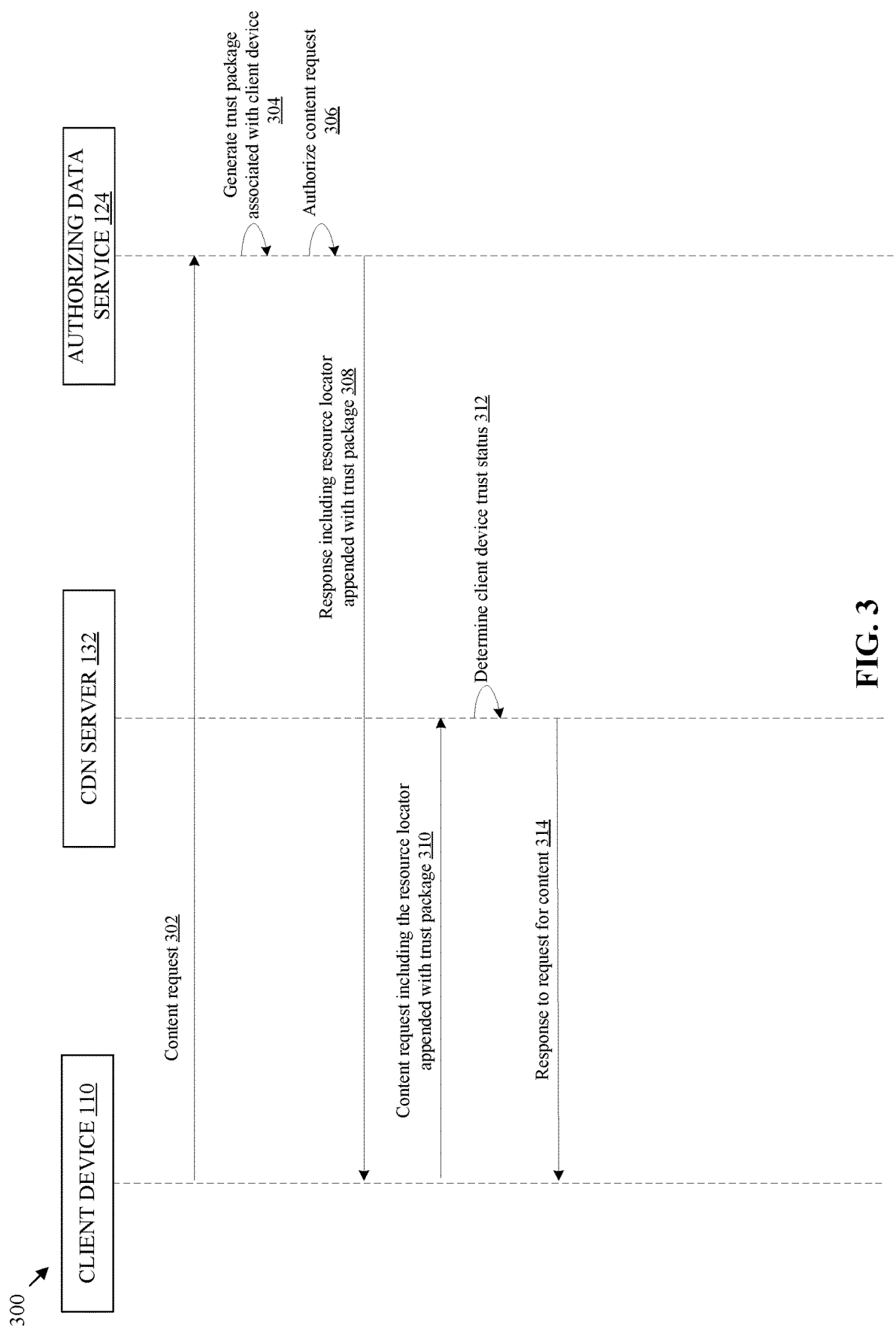
FIG. 3 is another diagram of operations for evaluating client device trust, in accordance with embodiments of the disclosure.

FIG. 3 is a diagram of operations for evaluating client device trust, in accordance with embodiments of the disclosure. System 300 may include similar components as system architecture 100 of FIG. 1. It may be noted that components of FIG. 1 may be used to help describe FIG. 3. For purposes of illustration, rather than limitation, operations with respect to system 300 are described as performed by authorizing data service 124 of content sharing platform 120, server machine 132 of content distribution network 130, or client device 110 may be performed by any component thereof, unless otherwise described. The operations described with respect to FIG. 3 are shown to be performed sequentially for the sake of illustration, rather than limitation. It may be noted that the operations may be performed in any order and that any of the operations may be performed concurrently with one or more other operations. In some implementations, the same, different, fewer, or greater number of operations may be performed in any order.

At operation 302, responsive to a user input for content, client device 110 sends a request to obtain content to authorizing data service 124 of content sharing platform 120. For example, a user of client device 110 can request to play a video item that is hosted by content sharing platform 120. In some embodiments, the user can use an application, such as a browser or native application, to request the content from content sharing platform 120. The content may be stored on one or more nodes or servers of a content delivery network (one or more CDN servers 132).

In some embodiments, the request from client device 110 to the authorizing data service 124 can include the format of the data to be received. For instance, the request can include a format of the video item that is compatible with the media viewer 112 at the client device 110. In some embodiments, the request can include additional information (e.g., type, version, etc.) pertaining to the media viewer 112 at which the content, such as a video item, is to be played back.

In some embodiments, the content request can include identifiers of the client device, or user account attempting to obtain the content. For example, the user request can identify a username and password associated with the user account requesting to obtain the content. In another example, the request can include a cookie that identifies the client device 110 or application at the user device, which can be used to identify a particular user account. For example, a user can login to content sharing platform 120 using user account information and, responsive to content sharing platform 120 authorizing the user account, the content sharing platform 120 can send a cookie to user device 120. In yet another example, the content request can include other data associated with the user or a user account, such as, for example, an internet protocol (IP) address associated with the client device.

At operation 304, authorizing data service 124 of content sharing platform 120 can generate a trust package associated with the content request. In some embodiments, the trust package can include data such as whether the user is logged in, a browser type used by the user to request the content, the geographic location of the user, the IP address of the user, and so forth. In some embodiments, the trust package can include instructions to the CDN server 132. The instructions can instruct CDN server 132 to perform one or more functions in response to a condition (or criterion) being satisfied. The functions can include rejecting the content request, reducing or cap the resolution of the requested content, requesting a ReCaptcha verification, requesting the user of client device 110 to sign in, etc. The condition can be based on one or more of the content request to CDN server 132 (at operation 310, below) originating from a specified region or not originating from a specified region, the content request to CDN server 132 using or not using an IP address or an IP address of a specified subnet, the content request to CDN server 132 using or not using a specified browser, etc. For example, the instructions can indicate to CDN server 132 to reduce the resolution of the requested content if the content request to CDN server 132 does not originate from a browser of a particular type.

At operation 306, authorizing data service 124 of content sharing platform 120 can authorize the content request. To authorize the request, authorizing data service 124 can determine that at least one of the client device 110 or the user (or user account), is permitted to obtain the content. In one example, the content request can identify the account information of the user account requesting to obtain the content.

For example, the account information can be encrypted in a cookie. In another example, the account information can be input by the user and provided in the request. In some embodiments, the account information, such as the username and password, can be authenticated by the authorizing data service 124 by comparing the account information (e.g., received username and password) with a stored record of the account information. If the account information of the request matches the account information of the record, the authorizing data service 124 can determine that the particular user account is authenticated, and the authorizing data service 124 can authorize the content request.

In some embodiments, responsive to the authorizing data service 124 failing to authorize the content request and/or authenticate client device 110, the content request can be denied by authorizing data service 124. In some embodiments, if authorizing data service 124 does not authorize the request to obtain the content, authorizing data service 124 can send a message to client device 110 indicating that authorization is not granted to obtain the requested content.

In some embodiments, responsive to the authorizing data service 124 authorizing the request to obtain the content, the authorizing data service 124 generates one or more resource locators (e.g., URLs) to authorize the client device 110 to obtain the requested content from CDN network 130. In some embodiments, the resource locators can identify the CDN server that is to deliver the requested content to the client device 110. For example, the resource locators can include a hostname, which identifies the particular server (e.g., server 112A, server 112B, etc.) that can be accessed to obtain the requested content. In some embodiments, the authorizing data service 124 can append the resource locator(s) with the trust package, and digitally sign the resulting response. The digital signature can be based on signed parameters (e.g., expiration parameter, bit rate parameter, playback event identifier parameter, etc.), which can be used to indicate to CDN server 132 which data is to be served and how the data is to be served. In some embodiments, the digital signature can be encrypted.

At operation 308, responsive to the user account being authorized, authorizing data service 124 can send a response to the request for content (e.g., operation 302) to client device 110. In some embodiments, the response can include the one or more resource locators that identifies server 132 of CDN 130 that is to deliver the content to the client device 110. In some embodiments, the response also includes the trust package, and the digital signature. In some embodiments, the response can include one or more of a content identifier, a user account identifier and/or a playback event identifier associated with the content request. In some embodiments, the response can be a HyperText Transfer Protocol (HTTP) response.

In some embodiments, authorizing data service 124 can send the trust package to the identified CDN server(s) 132 instead including the trust package in the response to client device 110. In some embodiments, the trust package is digitally signed using one or more signed parameters providing, for example, an expiration time for the trust package and/or a playback event identifier created for the content request.

At operation 310, client device 110 can request the content using the resource locator and the trust package, appended with the digital signature. In some embodiments, the request can be sent to CDN server 132. In some embodiments, CDN server 132 can decrypt the digital signature using, for example, one or more cryptographic keys, public keys, private keys, etc.

At operation 312, CDN server 132 can determine the client device trust status based on the trust package. The client device trust status can be any type of indicator used by CDN server 132 to determine whether to release the requested content to the user. In some embodiments, CDN server 132 can compare data from the trust package received at operation 310 (and/or received directly from authorizing data service 124) to data (e.g., CDN determined factors) obtained from the content request of operation 310. Based on the comparison (e.g., whether server 132 detects discrepancies in the comparison), server 132 can determine the client device trust status. In some embodiments, responsive to determining no discrepancies in the data obtained from the trust package and the data obtained from the content request of operation 310, CDN server 132 can assign a trusted status to the client device and release the requested content. In some embodiments, responsive to determining a discrepancy in the data obtained from the trust package and the data obtained from the content request of operation 310, CDN server 132 can assign an untrusted status or questionable status to client device 110, and reject the content request or downgrade the playback quality of the request, respectively. For example, responsive to CDN server 132 determining that the client device requested the content from authorizing data service 124 using a first type of browser, and requested the content from server 132 using a second type of browser, CDN server 132 can reduce the request content resolution of 1080 p to 480 p.

In some embodiments, responsive to determining a discrepancy in the data obtained from the trust package and the data obtained from the content request of operation 310, CDN server 132 can request client device 110 to perform one or more additional functions prior to server 132 releasing the requested content. The additional functions can include requesting a ReCaptcha verification, requesting the user of client device 110 to sign in, etc. For example, responsive to CDN server 132 determining that the client device requested the content from authorizing data service 124 using a first IP address, and requested the content from CDN server 132 using a different IP address, CDN server 132 can determine that the client device is questionable and request the user to sign into their user account.

At operation 314, based on the client device trust status, CDN server 132 can respond to the content request with content associated with the resource locator(s). For example, the response can include the requested video item when the client device trust status indicates that the client device is trusted, or with the requested video item in a lower format than requested when the client device is questionable.

In some embodiments, CDN server 132 can use any combination of the partial trust metric, the trust package, and/or the CDN determined factors to determine a client device trust status. For example, the authorizing data service 124 can generate one or more resource locators to authorize the client device 110 to obtain the requested content from CDN 130. The authorizing data service 124 can further append the resource locator(s) with the partial trust metric and the trust package, and send the resulting response to client device 110, and in addition the authorizing data service 124 can send the trust package to CDN server 132. CDN server 132 can then use the partial trust metric and the trust package to determine the client device trust status.

Figure 4:
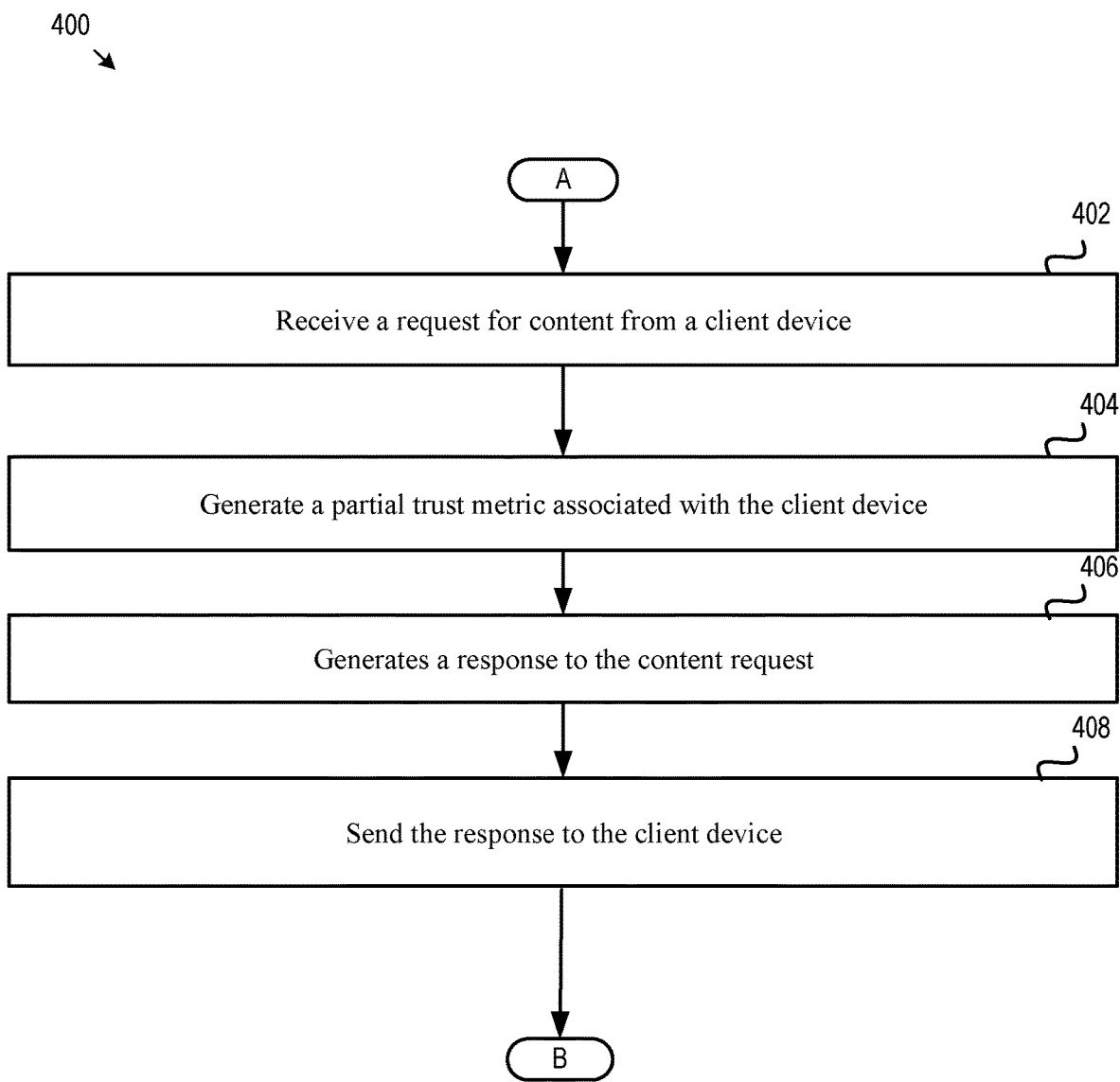
FIG. 4 depicts a flow diagram of a method for generating a partial trust metric, in accordance with embodiments of the disclosure.

FIG. 4 depicts a flow diagram of a method 400 for performing generating a partial trust metric, in accordance with embodiments of the disclosure. The method is performed by processing logic that may include hardware (circuitry, dedicated logic, etc.), software (e.g., instructions run on a processing device), or a combination thereof. In some embodiments, some or all the operations of method 400 may be performed by one or more components of system 100 of FIG. 1. In other embodiments, one or more operations of method 400 may be performed by an authorization module of content distribution network 130 or an authorizing data service 124, as described with respect to FIG. 1-2. It may be noted that components described with respect FIG. 1-3 may be used to illustrate aspects of FIG. 4.

At block 402 processing logic implementing method 400 receives a request for content from a client device.

At block 404, the processing logic generates, based on data available to the content sharing platform, a partial trust metric associated with the client device. In some embodiments, the partial trust metric is to be used by a CDN server to make a decision regarding access to the desired content by the client device, and can include a score to indicate to the CDN server a likelihood that the client device is trustworthy and should be authorized to access requested content. In some embodiments, the partial trust metric is generated based on one or more characteristics such as a watch history of a user associated with the client device, whether the user viewed the requested content before, whether the client device previously decrypted other content successfully, whether the user is logged-in, whether the user has engaged or been suspected of engaging in an unauthorized activity, the internet protocol (IP) address of the client device, or an encryption log associated with the user. The characteristics used to generate the partial trust metric may not be available to the CDN server. In some embodiments, the partial trust metric is generated using heuristic rules. In some embodiments, the partial trust metric is generated using a trained machine learning model. In some embodiments, the partial trust metric is encrypted for decryption by the CDN server.

At block 406, the processing logic generates a response to the content request. The response can include one or more resource locators provided by the content sharing platform to authorize the client device to obtain the requested content. The response can also include the partial trust metric, and can be digitally signed. In some embodiments, the processing logic can reject the content request based on the partial trust metric.

At block 408, the processing logic sends the response to the client device. The partial trust metric, but not any of the characteristics used to generated the metric, can be provided to the CDN server by the client device when requesting the desired content and can be used by the CDN server to determine whether to provide the requested content to the client device or downgrade the quality of the requested content. In some embodiments, method 400 can be used to generate a trust package, as discussed in FIG. 3.

Figure 5:
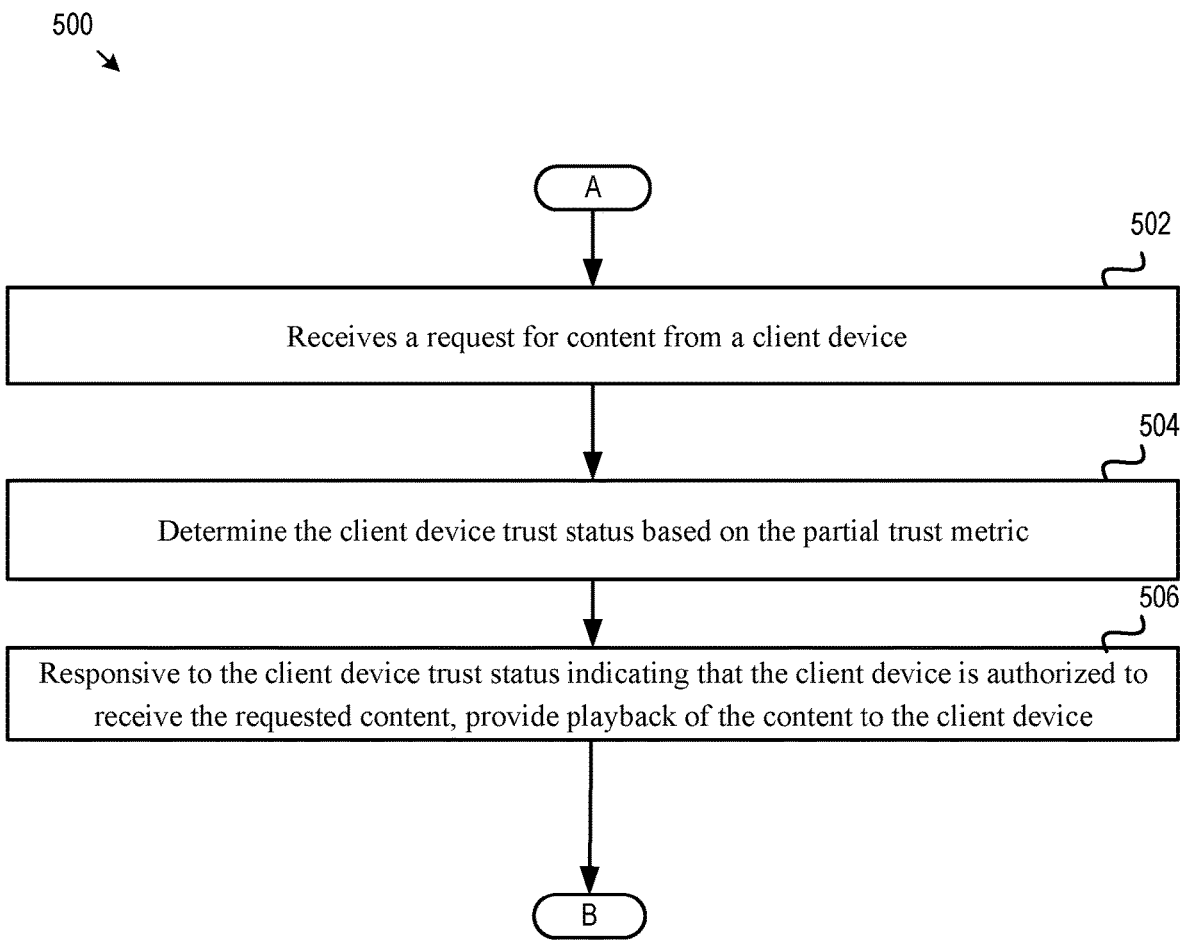
FIG. 5 depicts a flow diagram of a method for determining a client device trust status, in accordance with embodiments of the disclosure.

FIG. 5 depicts a flow diagram of a method 500 for determining a client device trust status, in accordance with embodiments of the disclosure. The method is performed by processing logic that may include hardware (circuitry, dedicated logic, etc.), software (e.g., instructions run on a processing device), or a combination thereof. In some embodiments, some or all the operations of method 500 may be performed by one or more components of system 100 of FIG. 1. In other embodiments, one or more operations of method 500 may be performed by an authorization module of CDN server 132 and/or an authorizing data server 124 as described with respect to FIG. 1-3. It may be noted that components described with respect FIG. 1-3 may be used to illustrate aspects of FIG. 5

At block 502 processing logic implementing method 500 receives a request for content from a client device. The request includes a resource locator provided by an authorizing data service to authorize a client device to obtain the requested content. The resource locator can be appended with a partial trust metric.

At block 504, the processing logic determines the client device trust status based on the partial trust metric. The client device trust status can be any type of indicator used by the processing logic to determine whether to release the requested content to the user. In some embodiments, the processing logic can compare the partial trust metric to one or more threshold values to determine the client device trust status. Based on the comparison, the processing logic can reduce or cap the resolution of the requested content, reduce or cap the frame rate, throttle the data transmitted to the client device, and so forth.

At block 506, responsive to the client device trust status indicating that the client device is authorized to receive the requested content, the processing logic provides playback of the content to the client device. For example, the processing logic can provide the video data associated with the resource locator. In some embodiments, method 500 can be used to determine client device trust status based on a trust package, as discussed in FIG. 3.

Figure 6:
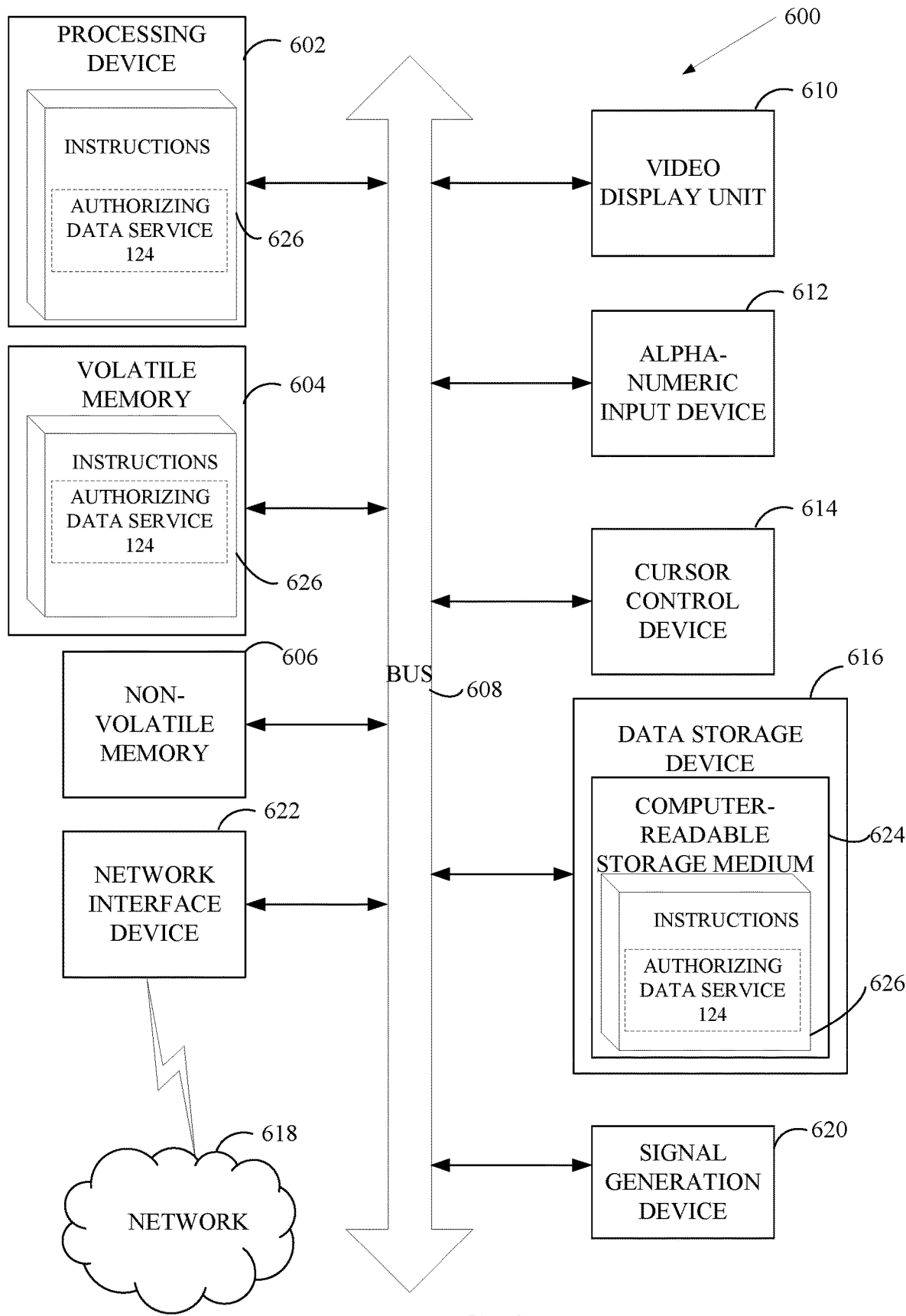
FIG. 6 is a block diagram illustrating an exemplary computer system, in accordance with an embodiment of the disclosure.

FIG. 6 is a block diagram illustrating an exemplary computer system 600, in accordance with an embodiment of the disclosure. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of initial playback module 142 (not shown), authorization module 138, and/or authorizing data service 124 (not shown). The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and authorization module 151 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100, data authorizing service 124, or of authorization module 138 (not shown) embodying any one or more of the methodologies or functions described herein. The sets of instructions of the system architecture 100, data authorizing service 124 or of authorization module 138 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating", "providing", "adjusting", "receiving", "canceling", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
   receiving, by a processing device of a content sharing platform, a request for desired content from a client device, the content being stored in a content delivery network (CDN);
   generating, based on data available to the content sharing platform, a partial trust metric associated with the client device, wherein the partial trust metric and one or more CDN determined factors are to be used by a CDN server to generate a final trust metric to be compared to a threshold criterion to make a decision regarding access to the desired content by the client device;
   generating a response to the content request, wherein the response comprises one or more resource locators for accessing the desired content in the CDN, and the partial trust metric; and
   sending the response to the client device to enable the client device to request the desired content from the CDN server using the one or more resource locators and the partial trust metric.

2. The method of claim 1, wherein the data available to the content sharing platform comprises one or more of a plurality of characteristics comprising a watch history of a user associated with the client device, whether the user previously viewed the desired content, whether the client device previously decrypted other content successfully, whether the user is logged-in, whether the user has engaged or been suspected of engaging in an unauthorized activity, an internet protocol (IP) address of the client device, or an encryption log associated with the client device.

3. The method of claim 1, wherein the partial trust metric is generated using heuristic rules.

4. The method of claim 1, wherein the partial trust metric is generated using a machine learning model.

5. The method of claim 1, wherein the response comprising the one or more resource locators and the partial trust metric is digitally signed using one or more signed parameters that provide at least one of an expiration time for the one or more resource locators and/or the partial trust metric, a bit rate for delivering the desired content, or an identifier of a playback event created for the request for the desired content.

6. The method of claim 1, further comprising:
   rejecting the content request based on the partial trust metric.

7. The method of claim 1, wherein the partial trust metric is to be used by the CDN server to determine whether to release the desired content to the client device or downgrade a quality of the desired content.

8. The method of claim 2, wherein the plurality of characteristics used to generate the partial trust metric are not available to the CDN server, and wherein the partial trust metric but not any of the plurality of characteristics are provided to the CDN server when the client device requests the desired content.

9. The method of claim 1, wherein the partial trust metric is to be combined, by the CDN server, with one or more additional factors to determine whether to release the desired content to the client device or downgrade a quality of the desired content, wherein the one or more additional factors are identified by the CDN server based on data available to the CDN server.

10. The method of claim 9, wherein the additional factors comprise at least one of an IP address used by the client device to request the content from the CDN server, one or more cookies provided to the CDN server with the content request, a client agent reported by the client device to the CDN server, a type of the requested content, a bitrate of the requested content, or an amount of content requested in the content request.

11. A non-transitory computer-readable medium comprising instructions that, responsive to execution by a processing device, cause the processing device to perform operations comprising:

receiving a request for desired content from a client device, the content being stored in a content delivery network (CDN);

generating, based on data available to the content sharing platform, a partial trust metric associated with the client device, wherein the partial trust metric and one or more CDN determined factors are to be used by a CDN server to generate a final trust metric to be compared to a threshold criterion to make a decision regarding access to the desired content by the client device;

generating a response to the content request, wherein the response comprises one or more resource locators for accessing the desired content in the CDN, and the partial trust metric; and sending the response to the client device to enable the client device to request the desired content from the CDN server using the one or more resource locators and the partial trust metric.

* * * * *